April 23, 1963     J. D. SORLEY ETAL     3,086,388
SEDIMENT TESTING DEVICE
Filed Dec. 7, 1959
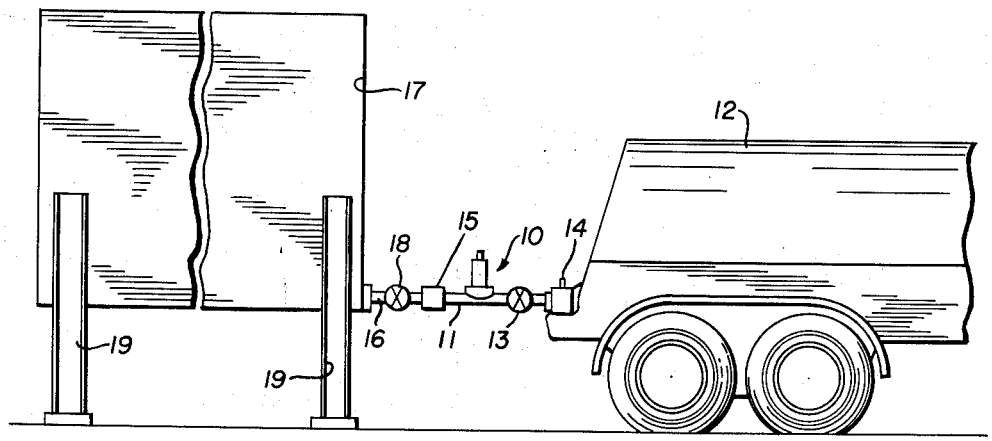
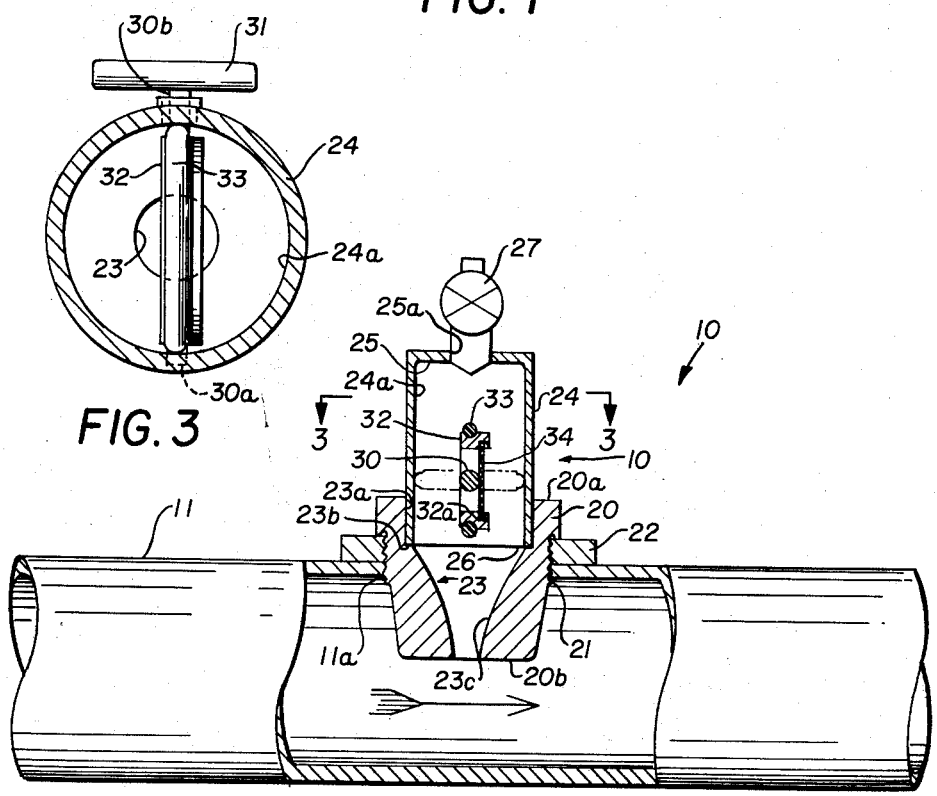
INVENTOR.
JAMES D. SORLEY &
WILLIAM C. LIST
BY
ATTORNEY _United States Patent Office_ 3,086,388
Patented Apr. 23, 1963

3,086,388
SEDIMENT TESTING DEVICE
James D. Sorley, 1469 2nd St., and William C. List, 270 W. Steels Corner Road, both of Cuyahoga Falls, Ohio
Filed Dec. 7, 1959, Ser. No. 857,781
2 Claims. (Cl. 73—61)

This invention relates to the art of sediment testing equipment and in particular has reference to sediment testing equipment for use in connection with equipment for transmitting bulk milk.

In the dairy industry, large suppliers of milk normally accumulate the unprocessed milk in storage tanks until such time as the bulk tank truck for the dairy picks the same up for transportation to the dairy, where the same is processed.

In the past no satisfactory or efficient apparatus has been provided for the purpose of enabling the driver of the bulk tank truck to make a sediment test on the milk prior to the time that the same reaches the dairy. As a result, it oftentimes occurs that when the bulk tank truck, containing milk from several storage sources, reaches the dairy, it is then discovered that an improper amount of sediment is present in the milk that has been collected.

Because of the fact that no tests have been made prior to receipt of the milk from the individual tanks, it is normally difficult in such situations to ascertain the origin of the defective milk, with the result that the milk has to be extensively treated and oftentimes discarded because of the impurities that are present.

The difficulties above referred to normally occur only with regard to bulk milk storage because in the usual situation where the milk is stored in five or ten gallon containers, the containers are picked up and marked for identification so that no problem as to source exists.

It has been proposed in the past to alleviate the problem of testing the bulk milk by various methods, including rather elaborate testing equipment that requires heating and various other testing equipment to be employed for the purpose of rendering an accurate test.

It has been discovered that the above disadvantages can be obviated if provision is made on the bulk tank truck for testing the sediment content of the bulk milk prior to its delivery to the bulk tank truck.

It has been further discovered that such sediment testing equipment can be provided for direct use with the normal suction line of the bulk tank truck so that the very pressure required to draw the milk from the tank to the truck will at the same time operate the sediment testing equipment, with the result that no additional testing apparatus is necessary other than a relatively small number of component parts.

It accordingly becomes a principal object of this invention to provide sediment testing apparatus that is designed for use with the intake equipment of the storage tank of a delivery truck.

It is a still further object of this invention to provide such apparatus in a simple, but highly effective, arrangement so that the use of the same will not materially increase the time required by the driver for the purpose of loading the milk into the truck.

These and other objects of the invention will become more apparent upon a reading of the following brief specification, considered and interpreted in the light of the accompanying drawings.

Of the drawings:
FIGURE 1 is a schematic elevational view showing the sediment testing means interconnected between the bulk storage tank and the milk hauling truck.
FIGURE 2 is an enlarged elevational view of the supply line and sediment testing means, partly broken away and in section.
FIGURE 3 is a horizontal section taken on the lines 3—3 of FIGURE 2.

Referring now to the drawings and in particular to FIGURE 1 thereof, the improved sediment testing means, generally designated by the numeral 10, is shown connected to the intake line 11 of a milk hauling truck 12, with a valve 13 being interposed in line 11 to control flow therethrough, and with the usual suction pump 14 being provided on the truck 12 for the purpose of drawing milk through the line 11 towards the interior of the truck. The free end of the line 11 connects, through coupler 15, with outlet pipe 16 of the bulk storage tank 17 and again a valve 18 is provided for the purpose of controlling the emission of milk from the interior of tank 17.

Additionally, an agitator (not shown) is associated with the tank 17 for compliance with the usual requirements in the dairy industry and the tank 17 is further shown elevated on supports 19, 19 so as to bring the discharge line 16 thereof into adjacency with the intake line 11 of the truck 12.

Referring now to FIGURE 2, the sediment testing means 10 are shown including a fitting 20 that is of generally circular configuration and which has a portion of its periphery threaded, as at 21, for threaded engagement with threads 11a that are provided in the wall of the pipe 11. A nut 22 facilitates tightening of the fitting 20 with respect to line 11.

In addition to the aforementioned component parts, the opposed axial ends 20a and 20b of the fitting 20 are shown inter-connected by a central bore 23 that includes a cylindrical bore portion 23a that opens into end wall 20a, a radially extending shoulder 23b and a tapering bore 23c that opens into the end 20b, as clearly shown in FIGURE 2 of the drawings.

In this fashion, the end 20b of fitting 20 will be preferably disposed interiorly of the line 11 in close proximity with the axis thereof.

Received within the bore 23a is a hollow cylindrical member 24 having a closed axial end 25 and an open axial end 26 that abuts against the shoulder portion 23b as shown in FIGURE 2.

The end wall 25 further includes an opening 25a within which a valve 27 may be received, with valve 27 preferably being opened or closed to the passage of air therethrough by operation of a handle in known fashion.

In addition to the forementioned component parts, a rod or shaft 30 extends diametrically of the cylindrical member 24 so as to be pivotably mounted with respect to diametrically opposed wall portions thereof. Preferably, and as best shown in FIGURE 3, the end portion 30a is journaled in the internal wall 24a of member 24 at one point, while the opposed end 30b passes through an opening therein so as to permit attachment of a handle 31 thereto for purposes now to be described.

A ring or plate 32 is mounted on the transversely extending rod 30 and is preferably fixed for movement therewith between the full and chain-dotted line position of FIGURE 2 upon operation of handle 31. The preferred embodiment of the ring 32 contemplates that the same shall approximate the internal diameter of member 24 and shall further have an O-ring 33 disposed around its peripheral edge for contact with internal wall 24a. Additonally, a sediment screen 34 is removably seated against shoulder 32a thereof for permitting collection of sediment on screen 34 when the ring 32 is in the chain-dotted line position of FIGURE 2.

It is to be understood that the screen 34 can be screwed or otherwise releasably associated with the ring 32 and as shown in FIGURE 2 it is preferred that the member 24 be readily detachable from the fitting 22 so as to permit removal of screen 34 after testing has been completed.

In use or operation of the improved sediment testing device, the hauling truck will first be moved into adjacency with the storage tank 17, at which time the line 11 thereof will be connected to discharge line 16 by use of the coupler 15 in known fashion.

With the component parts connected as just described, it is preferred that the agitator (not shown) be operated prior to the opening of valve 18 so as to fully stir the milk contained interiorly of the storage tank 17. This is prescribed by law in several states.

When the milk has been agitated as just described, the valve 18 can be opened to allow milk from tank 17 to enter line 11 and at this time the valve 13 will preferably be closed so that the milk cannot enter the interior of the hauling truck.

During this period the milk will flow by gravity and will, accordingly, fill the line 11 to the left of valve 13. At this time the ring 32 will be positioned in the upright or vertical position shown in full lines in FIGURE 2 so as to permit filling of the member 24. During this filling the valve 27 will be opened to let air evacuate from the interior of the member 24 and when an initial trace of milk is noticed emitting from the reservoir, the valve 27 may be returned to closed position, at which time the reservoir will be completely filled with a predetermined volume of milk.

At this time the handle 31 may be turned 90 degrees to seal off the milk in member 24 by moving the ring 32 to the horizontal position shown in chain-dotted lines in FIGURE 2 of the drawings. This divides member 24 into sub-chambers and preferably the volume of the upper portion is predetermined so that in each operation the sediment can be compared against a known volume.

With the ring 32 so positioned, the valve 13 may now be opened and pump 14 activated for a very short period of time to cause the formation of a pressure flow in line 11 in the direction of the arrow in FIGURE 2, also, valve 27 will be opened to air.

This pressure flow will create a vacuum in the lowermost portion of the fitting 20 due to the venturi effect obtained by the tapering bore 23c. This vacuum will cause the milk above the horizontally disposed ring 32 to be drawn through the screen portion 34 thereof, with the result that all milk trapped above the ring 32 will be evacuated upon actuation of the pump 14. Immediately following such evacuation, normally lasting for only a few seconds, the pump may be turned off and valves 13 and 18 closed, at which time the member 24 may be removed with respect to fitting 20, followed by removal of the screen portion 34. from plate 32.

When this has been effectuated, the reservoir unit may be returned to the position shown in FIGURE 2 and the valves 13 and 18 opened, followed by reactivation of the pump 14.

It is preferred, however, prior to the reactivation of the pump 14, that the sediment content of screen 34 be checked to see whether the same is within tolerable limits and if this can be determined by visual observation, the hauler may, at this point, either reject or accept the balance of milk contained in the tank 17.

In the event that the sediment content cannot be obtained accurately enough from visual observation, the hauler may place the screen 34 in an envelope and return the same to the dairy with the milk being hauled. In this fashion, the dairy, with its laboratory equipment, can carefully analyze the specimen and can thus locate the source in the event that the milk delivered by the truck is contaminated.

While a full and complete description of the invention has been set forth in accordance with the dictates of the Patent Statutes, it is to be understood that the invention is not intended to be so limited.

Accordingly, where appropriate, modifications of the invention may be resorted to without departing from the spirit hereof or the scope of the appended claims.

What is claimed is:

1. A method of testing the sediment content of fluid during transfer of the same through the testing apparatus of a connecting line that connects a land storage tank with the storage of a hauling truck, comprising the steps of: closing off fluid flow through said connecting line between said testing apparatus and said storage tank of said hauling truck while permitting fluid to flow into said testing apparatus, whereby said testing apparatus receives a measured amount of fluid therein; sealing off said measured amount of fluid trapped in said testing apparatus with a filter; opening said connecting line to fluid passage between the testing appaartus and the, storage tank of said hauling truck while simultaneously applying a suction pressure against the fluid sealed off by said filter, whereby said measured amount of trapped fluid will be drawn through said filter.

2. The method of claim 1 further comprising the step of closing said connecting line to fluid passage between said land storage tank and said testing apparatus, whereby the sediment content of said trapped fluid may be checked prior to further delivery of said fluid to said storage tank on said hauling truck.

References Cited in the file of this patent
UNITED STATES PATENTS

| | | |
|---|---|---|
| 87,250 | Ford | Feb. 23, 1869 |
| 1,963,080 | Featherstone | June 19, 1934 |
| 2,055,252 | Ferraez | Sept. 22, 1936 |
| 2,306,985 | Tolman | Dec. 29, 1942 |
| 2,435,578 | Ferraez | Feb. 10, 1948 |